US008314969B2

(12) United States Patent
Endoh et al.

(10) Patent No.: US 8,314,969 B2
(45) Date of Patent: Nov. 20, 2012

(54) IMAGE PROCESSING APPARATUS AND INFORMATION DISPLAY METHOD USED IN THE IMAGE PROCESSING APPARATUS

(75) Inventors: Tsuyoshi Endoh, Kawasaki (JP); Ryo Takemoto, Kawasaki (JP)

(73) Assignee: Ricoh Company, Limited, Tokyo (JP)

( * ) Notice: Subject to any disclaimer, the term of this patent is extended or adjusted under 35 U.S.C. 154(b) by 918 days.

(21) Appl. No.: 12/405,609

(22) Filed: Mar. 17, 2009

(65) Prior Publication Data

US 2009/0237692 A1    Sep. 24, 2009

(30) Foreign Application Priority Data

Mar. 18, 2008    (JP) ................................ 2008-069334

(51) Int. Cl.
*G06F 15/00* (2006.01)
*G06F 3/12* (2006.01)
(52) U.S. Cl. ........... 358/1.9; 358/1.1; 358/1.15; 358/1.2
(58) Field of Classification Search .................. None
See application file for complete search history.

(56) References Cited

U.S. PATENT DOCUMENTS

| 5,133,063 | A | 7/1992 | Naito et al. |
| 5,452,449 | A | 9/1995 | Baldwin, Jr. et al. |
| 7,065,634 | B2 | 6/2006 | Lewis et al. |
| 2002/0052856 | A1 | 5/2002 | Satoh |
| 2003/0084425 | A1 | 5/2003 | Glaser |
| 2005/0131927 | A1 | 6/2005 | Fildebrandt et al. |
| 2006/0176509 | A1* | 8/2006 | Aoki et al. ................ 358/1.15 |
| 2007/0013943 | A1 | 1/2007 | Sawayanagi et al. |
| 2007/0266368 | A1 | 11/2007 | Szpak et al. |
| 2007/0296992 | A1* | 12/2007 | Tanaka ..................... 358/1.13 |
| 2008/0037042 | A1* | 2/2008 | Furuichi et al. ............ 358/1.6 |
| 2008/0040392 | A1 | 2/2008 | Sugishita |

FOREIGN PATENT DOCUMENTS

| EP | 1 863 268 A1 | 12/2007 |
| JP | 3697176 | 7/2005 |

* cited by examiner

*Primary Examiner* — Marivelisse Santiago Cordero
*Assistant Examiner* — Huo Long Chen
(74) *Attorney, Agent, or Firm* — Oblon, Spivak, McClelland, Maier & Neustadt, L.L.P.

(57) ABSTRACT

An image processing apparatus includes a processor and a storage device to store instructions which cause the processor to operate as a specially programmed processor. The processor executes a multi-application in which a plurality of applications is combined, each of the applications configured to input, process, and output image data; displays a screen including display areas to enter input- and output-setting items; displays a multi-application screen including a feedback display area; identifies, when a content of the input- and output-setting items is changed for one application of the applications, another application for which a content of the input- and output-setting items is changed by the setting change for the one application; identifies a difference before and after the change in the content of the input- and output-setting items of the another application; and switches a display of the feedback display area in accordance with the difference to setting-change-influence information.

20 Claims, 19 Drawing Sheets

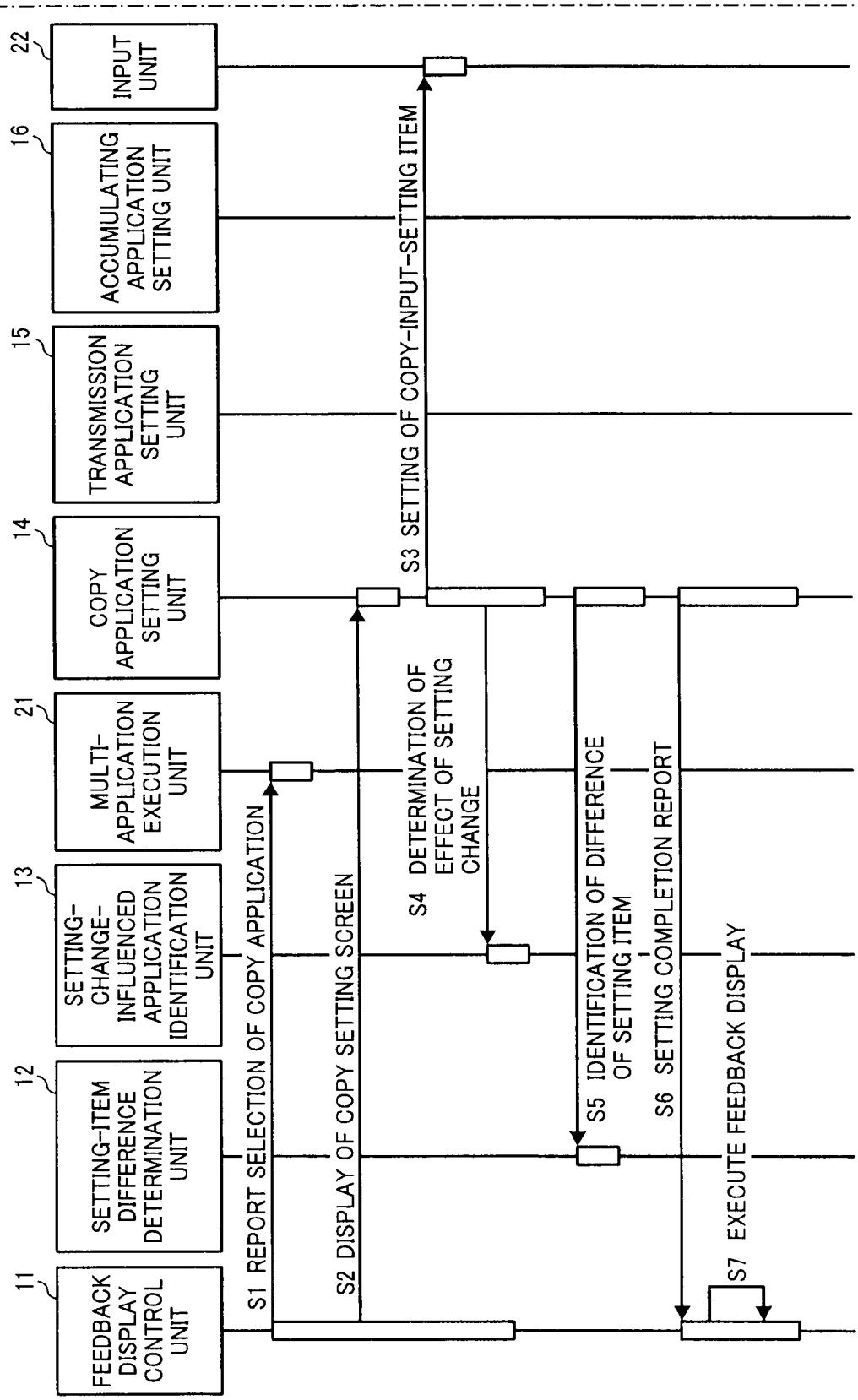

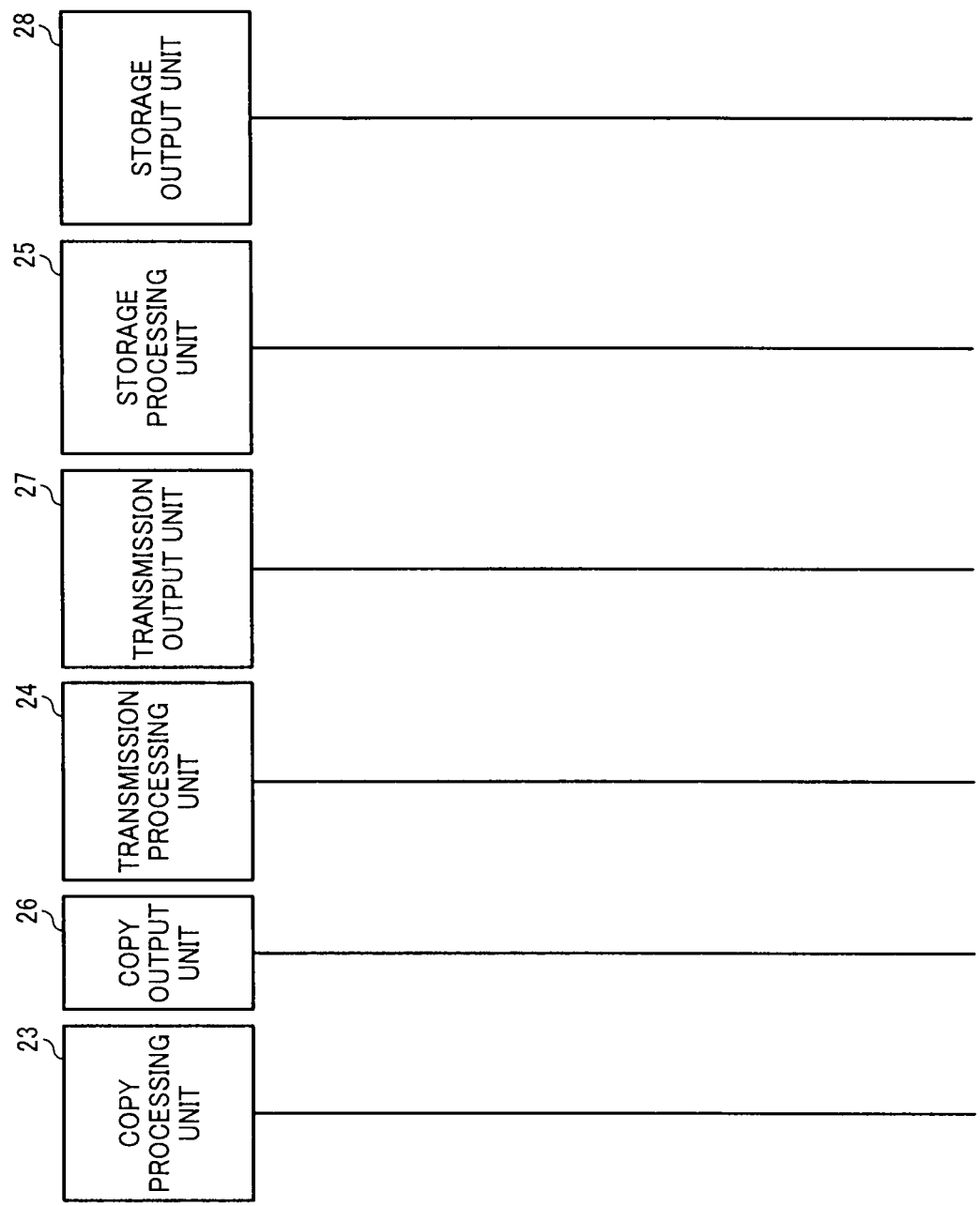

FIG. 8

GROUP-1 MEMBER TRANSMISSION (STORAGE)

CHANGE SETTING AND PRESS "OK" KEY

CANCEL    OK

PAGE: 1

APPARATUS
\\ABCDE HIJ Color 4100\folder1\document

REFERENCE
DIRECT INPUT

FULL COLOR
COLOR SELECTION

☐☐☐☐☐☐
DENSITY SETTING

NO
FILE STORAGE

DUPLEX/SPLIT

100%
MAGNIFICATION

INTEGRATION

SORT/STACK:
SORT

STAPLE:
LEFT-SIDE TWO POINTS

PUNCH:
LEFT-SIDE TWO HOLES

EDIT SETTING    FILE INFORMATION

48

CHECK SETTING

SELECT ELECTRONIC FILE

DOCUMENT SET DIRECTION:

DOCUMENT TYPE:
TEXT/PHOTO

SCAN SETTING

47

∧
∨

FIG. 9
| SETTING ITEM | | |
|---|---|---|
| INPUT | PROCESSING | OUTPUT |
| DOCUMENT SET DIRECTION<br>DOCUMENT TYPE<br>FINAL DOCUMENT DESIGNATION<br>FINISHED STAMP<br>etc. | INTEGRATION<br>MAGNIFICATION<br>IMAGE-QUALITY ADJUSTMENT<br>DROP-OUT COLOR<br>etc. | COLOR SELECTION<br>STAPLING<br>SORTING<br>ADDRESS<br>etc. |
FIG. 10
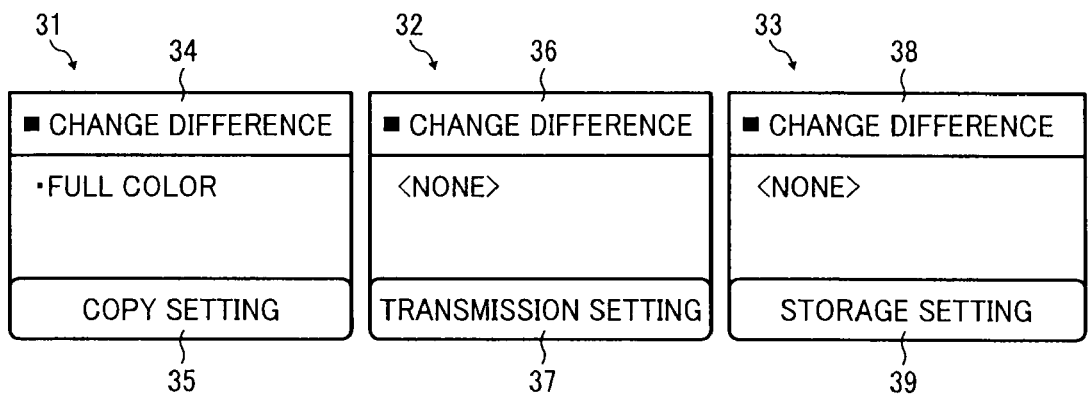
FIG. 11
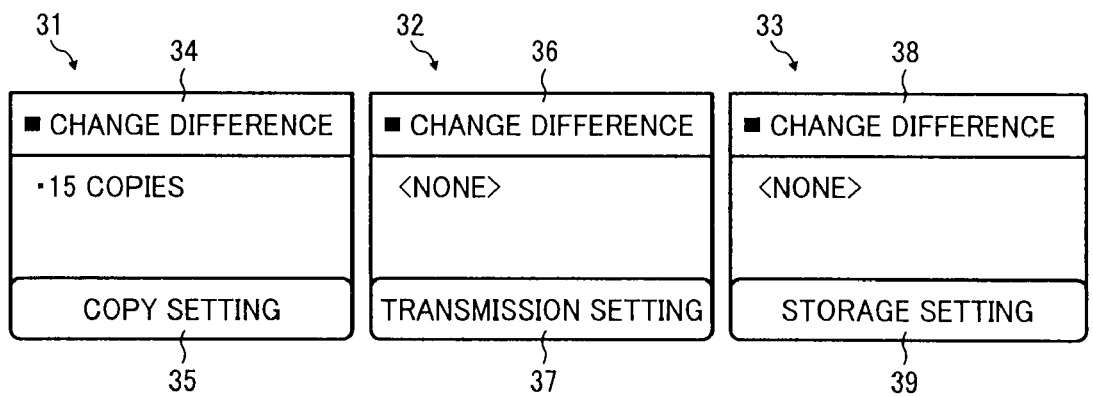

IMAGE PROCESSING APPARATUS AND INFORMATION DISPLAY METHOD USED IN THE IMAGE PROCESSING APPARATUS

CROSS-REFERENCE TO RELATED APPLICATIONS

The present patent application claims priority pursuant to 35 U.S.C. §119 from Japanese Patent Application No. 2008-069334, filed on Mar. 18, 2008 in the Japan Patent Office, the entire contents of which are hereby incorporated herein by reference.

BACKGROUND OF THE INVENTION

1. Field of the Invention

Illustrative embodiments of the present invention relate to an image processing apparatus including an image forming device, such as a facsimile machine, a printer, a copier, or a multi-functional device combining several of the foregoing capabilities, an information display method used in the image processing apparatus, and a recording medium storing instructions that cause the apparatus to execute the method.

2. Description of the Background

One conventional image processing apparatus receives a plurality of setting values input by a user through a user interface and executes various types of processing on image data in accordance with the setting values. Such an image processing apparatus may register a set of operations regularly used by a user as a "routine task".

In such a routine task, it is possible to register a setting in which a plurality of applications is executed collectively as a multi-application. For example, respective operations of copy application, transmission application, and storage application may be collectively executed in one operation as a routine task.

Such a multi-application may include a setting screen that enables a user to set specific items regarding the input, processing, and output operations of each application, as well as a multi-application screen having an entrance to a setting screen for each application. Such a configuration allows a user to use the plurality of applications in the substantially same manner as when independently using each application.

Further, such a plurality of applications integrated as one multi-application may share some setting items in common. When the content of any setting item of one application is changed, an associated setting item of another application may be automatically changed as well.

However, with the above-described conventional image processing apparatus, when a change in one setting of one application automatically causes a change in a setting of another application, a user cannot easily ascertain the changed setting of each application, thus complicating operation.

SUMMARY OF THE INVENTION

The present disclosure provides an image processing apparatus capable of, when a change in the content of a setting item of one of a plurality of applications automatically causes a change in the content of a setting item for another one of the plurality of applications, easily ascertaining the changed content of the setting item for the another application, an information display method used in the image processing apparatus, and a recording medium storing instructions that cause the image processing apparatus to execute the information display method.

In one illustrative embodiment, an image processing apparatus includes a processor and a storage device to store computer programmed instructions which when activated by the processor cause the processor to operate as a specially programmed processor. The processor is configured to execute a multi-application in which a plurality of applications is combined, each of the plurality of applications configured to input, process, and output image data; display, when a user enters settings for each of the plurality of applications, an application setting screen including an input-setting-item display area to enter an input-setting item that influences an input operation of the inputting and an output-setting-item display area to enter an output-setting item that influences at least one of a processing operation of the processing and an output operation of the outputting; display a multi-application screen including a feedback display area that displays information containing contents of the input-setting item and the output setting item entered for the inputting, the processing, and the outputting of each of the plurality of applications; identify, when a content of at least one of the input setting item entered for the inputting and the output setting item input for at least one of the processing and the outputting is changed for one application of the plurality of applications, another application for which a content of at least one of the input setting item input for the inputting and the output setting item entered for at least one of the processing and the outputting is changed by the setting change for the one application; identify a difference before and after the change in the content of the at least one of the input setting item and the output setting item of another application identified by the identifying the another application; and switch a display content of the feedback display area in accordance with the difference identified by the identifying the difference to display setting-change-influence information on effect of the setting change for the one application on the another application.

In another illustrative embodiment, an information display method used in an image processing apparatus includes the steps of executing a multi-application in which a plurality of applications is combined, including inputting image data to the image processing apparatus, processing the image data input at the inputting, and outputting the processed image data; displaying, when a user enters setting items for each of the plurality of applications, an application setting screen including an input-setting-item display area to enter an input-setting item that influences an input operation of the inputting and an output-setting-item display area to enter an output-setting item that influences at least one of a processing operation of the processing and an output operation of the outputting; displaying a multi-application screen including a feedback display area to display information containing contents of the input-setting item entered for the inputting and the output setting item entered for the at least one of the processing and the outputting of each of the plurality of applications; identifying, when a content of at least one of the input setting item entered for the inputting and the output setting item entered for the at least one of the processing and the outputting is changed for one application of the plurality of applications, another application for which a content of at least one of the input setting item entered for the inputting and the output setting item entered for at least one of the processing and the outputting is changed by the setting change for the one application; identifying a difference before and after the change in the content of the at least one of the input setting item entered for the inputting and the output setting item entered for the at least one of the processing and the outputting of the another application identified by the identifying step of the another application; and switching a display content of the feedback display area in accordance with the difference identified by the identifying step of the difference to display setting-change-influence information on influence of the setting change for the one application on the another application.

In still another illustrative embodiment, an image processing apparatus includes multi-application execution means, application-setting-screen display means, multi-application-screen display means, affected-application identification means, setting-item difference identification means, and feedback-display control means. The multi-application execution means executes a multi-application in which a plurality of applications is combined. Each of the plurality of applications includes input means for inputting image data and processing output means for processing the image data input from the input means and outputting the processed image data. The application-setting-screen display means, when a user enters settings for each of the plurality of applications, displays an application setting screen including an input-setting-item display area to enter an input-setting item that influences an input operation of the input means and an output-setting-item display area to enter an output-setting item that influences at least one of a processing operation and an output operation of the processing output means. The multi-application-screen display means displays a multi-application screen including a feedback display area that displays information containing contents of the input-setting item and the output setting item entered for the input means and the processing output means of each of the plurality of applications. The affected-application identification means, when a content of at least one of the input setting item entered for the input means and the output setting item input for the processing output means is changed for one application of the plurality of applications, identifies another application for which a content of at least one of the input setting item input for the input means and the output setting item entered for the processing output means is changed by the setting change for the one application. The setting-item difference identification means identifies a difference before and after the change in the content of the at least one of the input setting item and the output setting item of another application identified by the affected-application identification means. The feedback-display control means switches a display content of the feedback display area in accordance with the difference identified by the setting-item difference identification means to display setting-change-influence information on effect of the setting change for the one application on another application.

BRIEF DESCRIPTION OF THE DRAWINGS

A more complete appreciation of the disclosure and many of the attendant advantages thereof will be readily acquired as the same becomes better understood by reference to the following detailed description when considered in connection with the accompanying drawings, wherein:

FIG. 3 is a diagram illustrating a feedback display sequence executed in components illustrated in FIG. 1;

FIG. 8 is an illustration of an example of a storage-application setting screen;

FIG. 9 is an illustration of an example of a list containing input-setting items and output-setting items of each of a copy-application setting screen, a transmission-application setting screen, and a storage-application setting screen;

FIG. 10 is an illustration of an example of feedback display on the multi-application screen;

FIG. 11 is an illustration of an example of feedback display on the multi-application screen;

FIG. 22 is an illustration of a display example on a setting screen for setting registration display information;

Figure 1:
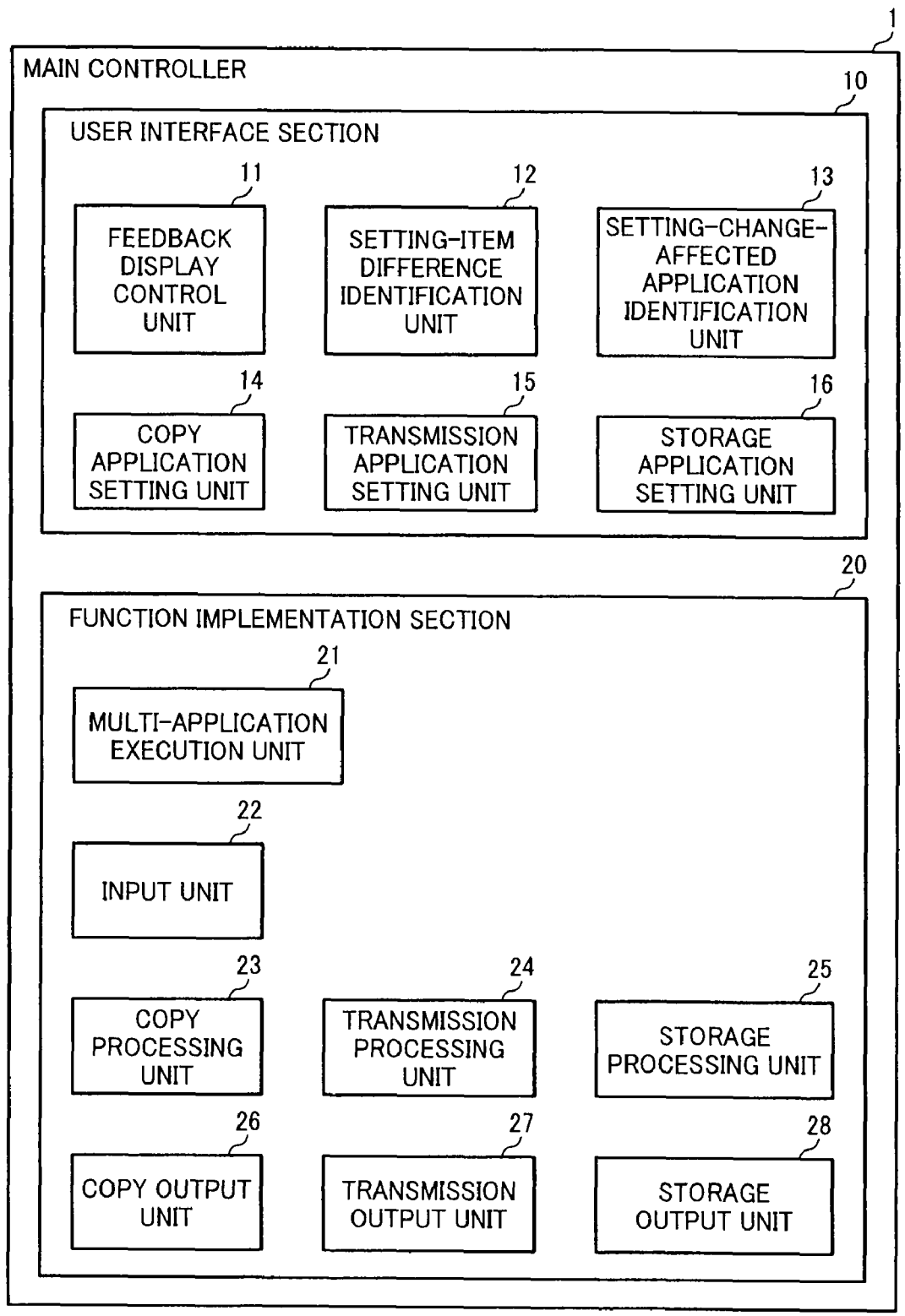
FIG. 1 is a block diagram illustrating a functional configuration of an image forming apparatus according to an illustrative embodiment of the present disclosure.

The accompanying drawings are intended to depict illustrative embodiments of the present disclosure and should not be interpreted to limit the scope thereof. The accompanying drawings are not to be considered as drawn to scale unless explicitly noted.

DETAILED DESCRIPTION OF ILLUSTRATIVE EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the illustrative embodiments are described with technical limitations with reference to the attached drawings, such description is not intended to limit the scope of the present invention and all of the components or elements described in the illustrative embodiments of this disclosure are not necessarily indispensable to the present invention.

Below, a description is given of illustrative embodiments according to the present disclosure with reference to the drawings.

FIG. 1 is a block diagram illustrating a functional configuration of an image forming apparatus according to an illustrative embodiment of the present disclosure.

The image forming apparatus is an image processing apparatus with capabilities of a facsimile machine, a printer, and a copier, and includes a main controller 1 implemented by a CPU (central processing unit), a ROM (read only memory), and a RAM (random access memory).

Below, a description is given of an example of the image forming apparatus that includes three applications for performing copy, transmission, and storage operations and is capable of collectively performing such operations as a routine task using one multi-application. However, it is to be noted that the image forming apparatus may include any one or two of the above-described three applications or further include one or more applications other than the above-described three applications.

The main controller 1 includes a user interface section 10 and a function implementation section 20.

The user interface section 10 includes a feedback display control unit 11, an setting-item difference identification unit 12, an affected-application identification unit 13, a copy-application setting unit 14, a transmission-application setting unit 15, and a storage-application setting unit 16.

When a user enters settings of one of the copy, transmission, and storage applications, the feedback display control unit 11 displays a corresponding application-setting screen and a corresponding feedback display area. The application-setting screen includes an input-setting-item display area for a user to enter input-setting items, which influence the input operation of an input unit 22 and an output-setting-items display area for a user to enter output-setting items, which influence the processing operations of a copy processing unit 23, a transmission processing unit 24, and a storage processing unit 25 and the output operations of a copy output unit 26, a transmission output unit 27, and a storage output unit 28. A multi-application screen includes a feedback display area to display information such as contents of the input-setting items and output-setting items set for the input, processing, and output operations of each application of the multi-application.

When the content of any input-setting item or output-setting item set for one of the above-described applications is changed, the affected-application identification unit 13 identifies another application for which the content of any input-setting item or output-setting item is changed by the first change.

The setting-item difference identification unit 12 determines a difference in the content of any input-setting item or output-setting item set for the affected application identified by the affected-application identification unit 13 before and after the setting change.

Further, the feedback display control unit 11 switches the display content of the feedback display area to display setting-change-influence information in accordance with the difference identified by the setting-item difference identification unit 12.

The copy-application setting unit 14 sets the input unit 22, the copy processing unit 23, and the copy output unit 26 to the contents set or changed for input-setting items and output-setting items in a copy-application setting screen.

The transmission-application setting unit 15 sets the input unit 22, the transmission processing unit 24, and the transmission output unit 27 to the contents set or changed for input-setting items and output-setting items in a transmission-application setting screen.

The storage-application setting portion 16 sets the input unit 22, the copy output unit 26, and the storage output unit 28 to the contents set or changed for the input-setting items and output-setting items in a storage-application setting screen.

The function implementation section 20 includes a multi-application execution unit 21, the input unit 22, the copy processing unit 23, the transmission processing unit 24, the storage processing unit 25, the copy output unit 26, the transmission output unit 27, and the storage output unit 28.

The multi-application execution unit 21 executes a multi-application in which any two or all of the copy application, the transmission application, and the storage application are combined.

The input unit 22 inputs image data from a scanner (an image reading device) or an external device through a network. For the input operation of image data from the scanner, the input unit 22 inputs image data in accordance with the contents set for a plurality of input-setting items that influence the input operation.

The copy processing unit 23 preliminarily performs copy processing on the image data input from the input unit 22 in accordance with the contents of output-setting items that influence copy processing operation.

The transmission processing unit 24 preliminarily performs transmission processing on the image data input from the input unit 22 in accordance with the contents of output-setting items that influence transmission processing operation.

The storage processing unit 25 preliminarily performs storage processing on the image data input from the input unit 22 in accordance with the contents of output-setting items that influence storage processing operation.

The copy output unit 26 outputs a printed copy of the image data processed in the copy processing unit 23 using a printer in accordance with the contents of output-setting items that influence copy output operation.

The transmission output unit 27 outputs, as transmission data, the image data processed in the transmission processing unit 24 through data communication of a network communication unit or facsimile communication of a facsimile communication unit in accordance with the contents of output-setting items that influence transmission output operation.

The storage output unit 28 outputs and stores the image data processed in the storage processing unit 25 onto an HDD (hard disk drive), a storage device such as an optical-disc device, or an external server machine connected through a network in accordance with the contents of output-setting items that influence storage output operation.

Figure 2:
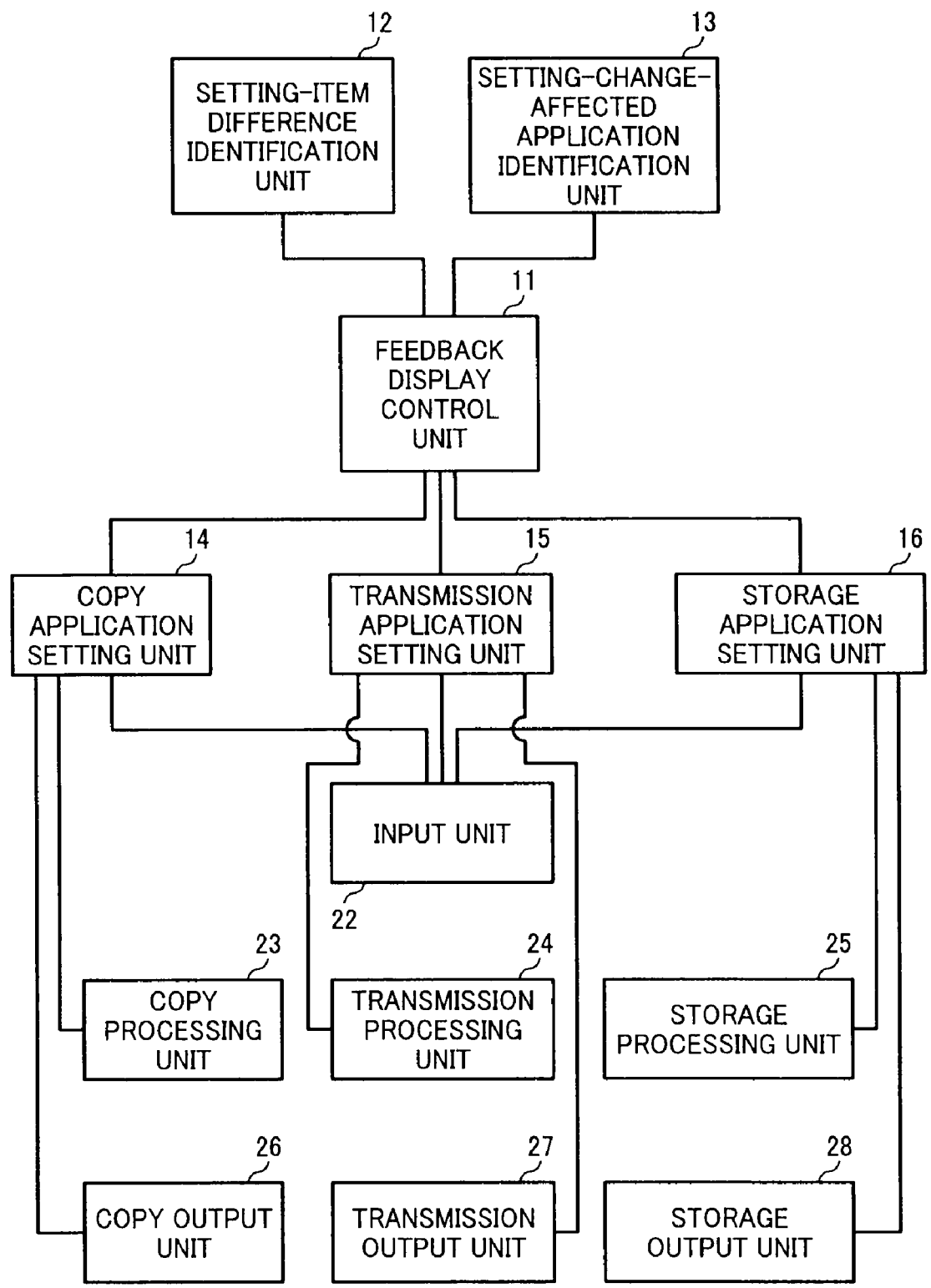
FIG. 2 is a diagram illustrating interactions between components illustrated in FIG. 1 when feedback display is executed.

FIG. 2 is a schematic diagram illustrating interactions between components illustrated in FIG. 1 when feedback display is executed.

FIG. 3 is a diagram illustrating a feedback display sequence executed in components illustrated in FIG. 1.

When, for example, a user selects copy setting from the multi-application screen of an operation display unit, at S1 illustrated in FIG. 3 the feedback display control unit 11 transmits to the multi-application execution unit 21 a signal indicating that the copy setting for the copy application is selected. The screen of the operation display unit shifts from the multi-application screen to a copy setting screen.

At S2, the feedback display control unit 11 transmits to the copy-application setting unit 14 a signal indicating that the copy setting screen has been displayed.

At S3, the copy-application setting unit 14 transmits a signal representing the content of a copy-input setting item input from the copy setting screen to the input unit 22. In the input unit 22, the input-setting item is set to the content represented by the signal.

At S4, the copy-application setting unit 14 transmits a setting-change-influence determination instruction for instructing the affected-application identification unit 13 to identify other application(s) affected by the change in the contents of the copy-input-setting items. The affected-application identification unit 13 identifies such affected application and transmits identification results to the setting-item difference identification unit 12.

At S5, the copy-application setting unit 14 transmits a setting-item difference determination instruction for instructing the setting-item difference identification unit 12 to determine a difference in the contents of input-setting items and output-setting items of the affected application identified by the affected-application identification unit 13 before and after change. The setting-item difference identification unit 12 determines such a difference based on the identification result transmitted from the affected-application identification unit 13 and transmits a determination result to the feedback display control unit 11.

At S6, the copy-application setting unit 14 transmits to the feedback display control unit 11 a notice indicating that the copy setting has been completed.

At S7, the feedback display control unit 11 executes feedback display for switching the display content of the feedback display area on the multi-application screen to the setting-change influence information in accordance with the determination result transmitted from the setting-item difference identification unit 12.

As described above, in each of copy processing, copy output, transmission processing, transmission output, storage processing, and storage output, substantially the same process is executed to switch the display content of the feedback display area.

Figure 4:
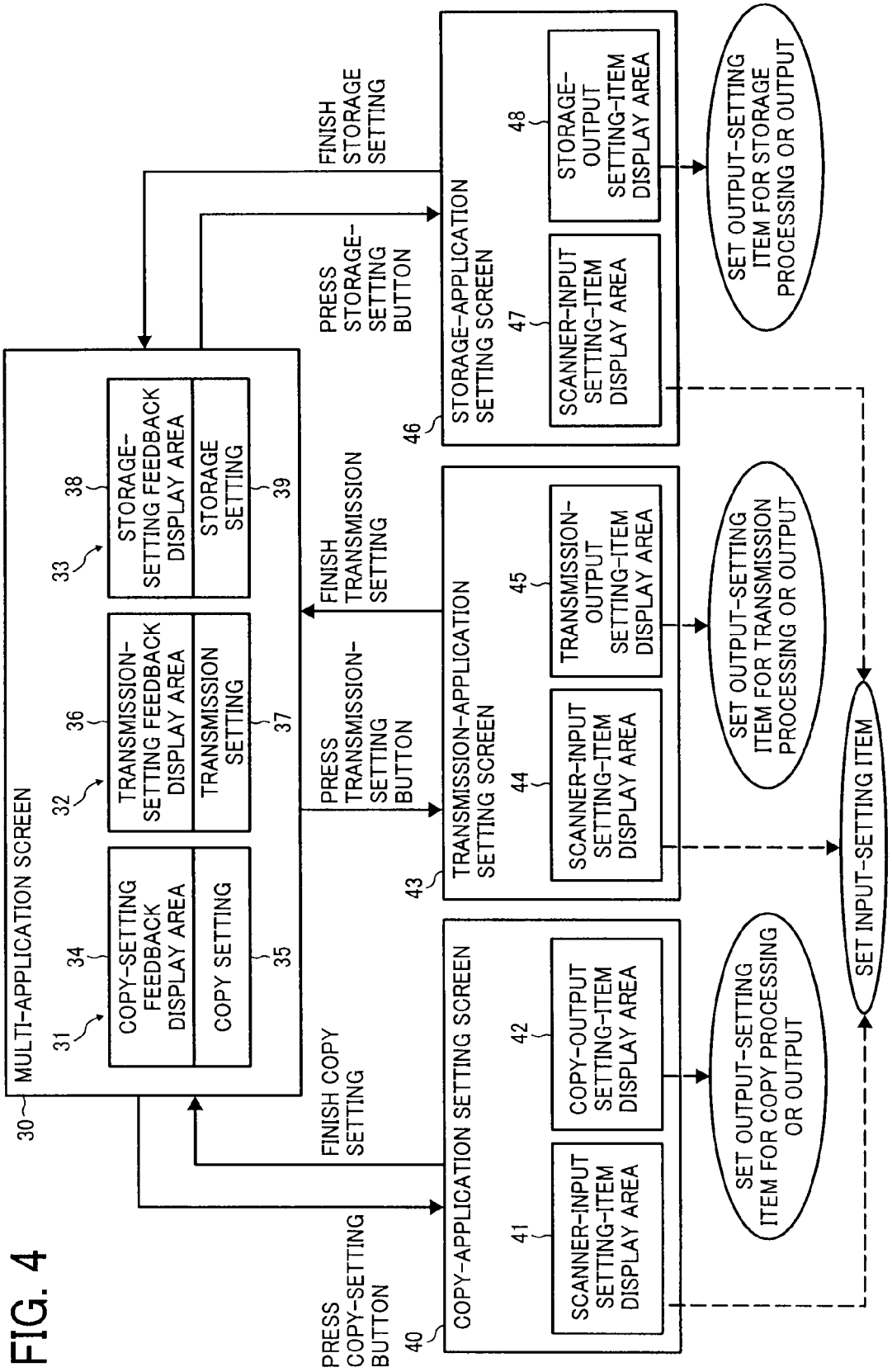
FIG. 4 is a schematic diagram illustrating a configuration of a multi-application screen and respective setting screens of copy, transmission, and storage applications.

FIG. 4 is a schematic diagram illustrating a configuration of the multi-application screen 30 and the setting screens for copy, transmission, and storage applications.

The multi-application screen 30 displays, for example, a copy display area 31, a transmission display area 32, and a storage display area 33.

The copy display area 31 includes a copy-setting feedback-display area 34 that normally displays the contents of copy setting items and switches the display content to the setting-change-influence information when the content of any setting item is changed. The copy display area 31 displays a copy setting button 35 for displaying the copy setting screen.

The transmission display area 32 includes a transmission-setting feedback-display area 36 that normally displays the contents of transmission setting items and switches the display content to the setting-change-influence information when the content of any setting item is changed. The transmission display area 32 displays a transmission setting button 37 for displaying the transmission setting screen.

The storage display area 33 includes a storage-setting feedback-display area 38 that normally displays the contents of storage setting items and switches the display content to the setting-change-influence information when the content of any setting item is changed. The storage display area 33 displays a storage setting button 39 for displaying the storage setting screen.

A copy-application setting screen 40 includes a scanner-input-setting-item display area 41 for setting the contents of input-setting items for the input unit 22 and a copy-output-setting-item display area 42 for setting the contents of output-setting items for the copy processing unit 23 and the copy output unit 26.

A transmission-application setting screen 43 includes a scanner-input-setting-item display area 44 for setting the contents of input-setting items for the input unit 22 and a transmission-output-setting-item display area 45 for setting the contents of output-setting items for the transmission processing unit 24 and the transmission output unit 27.

A storage-application setting screen 46 includes a scanner-input-setting-item display area 47 for setting the contents of input-setting items for the input unit 22 and a storage-output-setting-item display area 48 for setting the contents of output-setting items for the storage processing unit 25 and the storage output unit 28.

Such input-setting items set in the scanner-input-setting-item display areas 41, 44, and 47 are shared for the copy, transmission, and storage applications.

Figure 5:
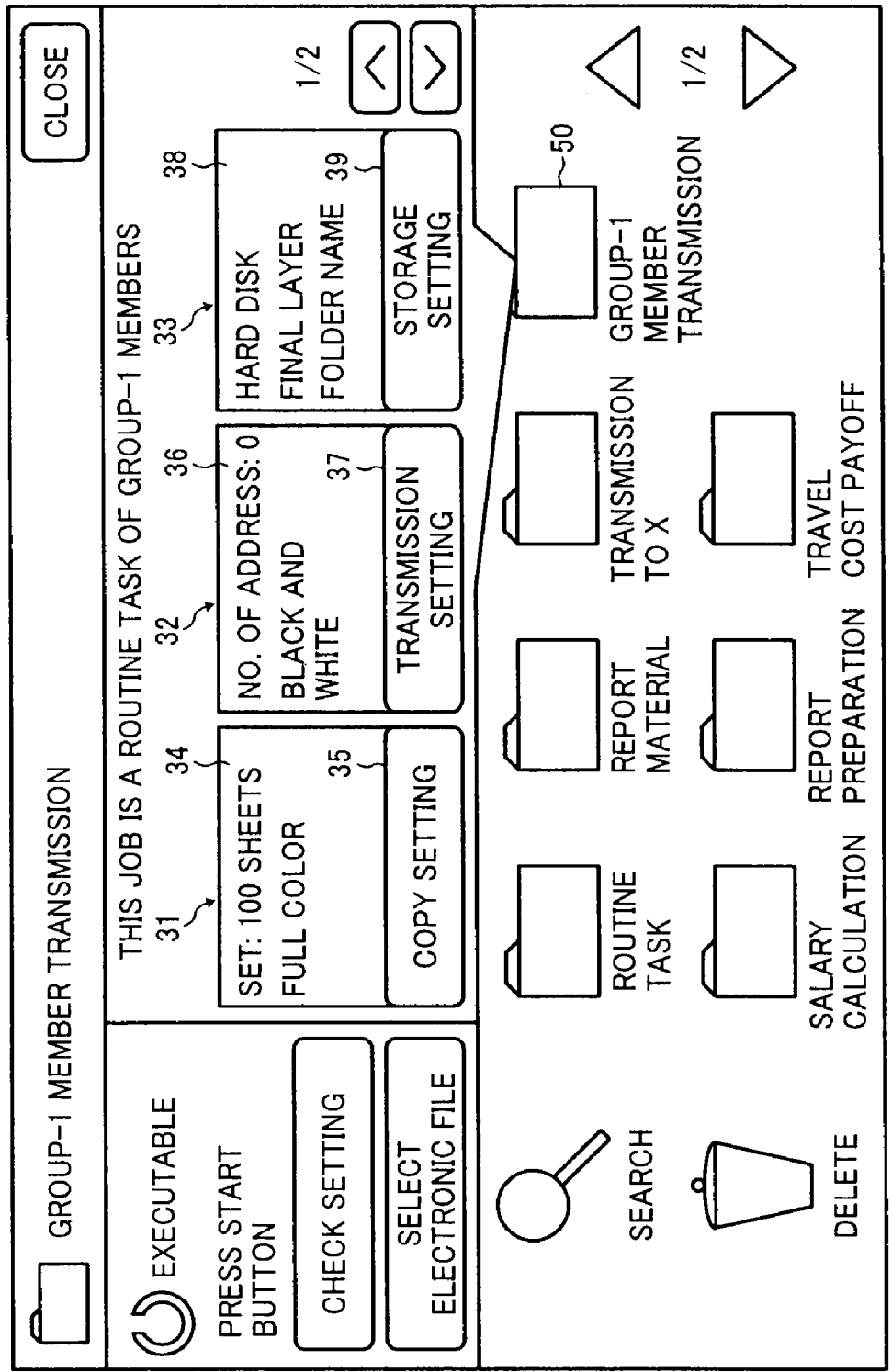
FIG. 5 is an illustration of an example of a multi-application screen.

FIG. 5 is an illustration of an example of the multi-application screen.

In FIG. 5, as one example of the multi-application, a routine task named "group-1 member transmission" is registered to collectively execute the copy, transmission, and storage applications. When a group-1 member transmission folder icon 50 is selected on the multi-application screen, a dialogue-balloon screen including the copy display area 31, the transmission display area 32, and the storage display area 33 is displayed.

The copy-setting feedback-display area 34 of the copy display area 31, the transmission-setting feedback-display area 36 of the transmission display area 32, and the storage-setting feedback-display area 38 of the storage display area 33 display a portion of the contents of setting items currently set as default display content in each feedback display area.

When the copy setting button 35 of the copy display area 31 is selected (or touched), the copy-application setting screen in the routine task named "group-1 member transmission" is displayed. Alternatively, when the transmission setting button 37 of the transmission display area 32 is selected, the transmission-application setting screen in the routine task "group-1 member transmission" is displayed. Further, when the storage setting button 39 of the storage display area 32 is selected, the storage-application setting screen in the routine task "group-1 member transmission" is displayed.

Figure 6:
FIG. 6 is an illustration of an example of a copy-application setting screen.

FIG. 6 is an illustration of an example of the copy-application setting screen.

The copy-application setting screen illustrated in FIG. 6 is an example of the copy-application setting screen displayed in the above-described routine task "group-1 member transmission" and includes the scanner-input-setting-item display area 41 and the copy-output-setting-item display area 42.

Figure 7:
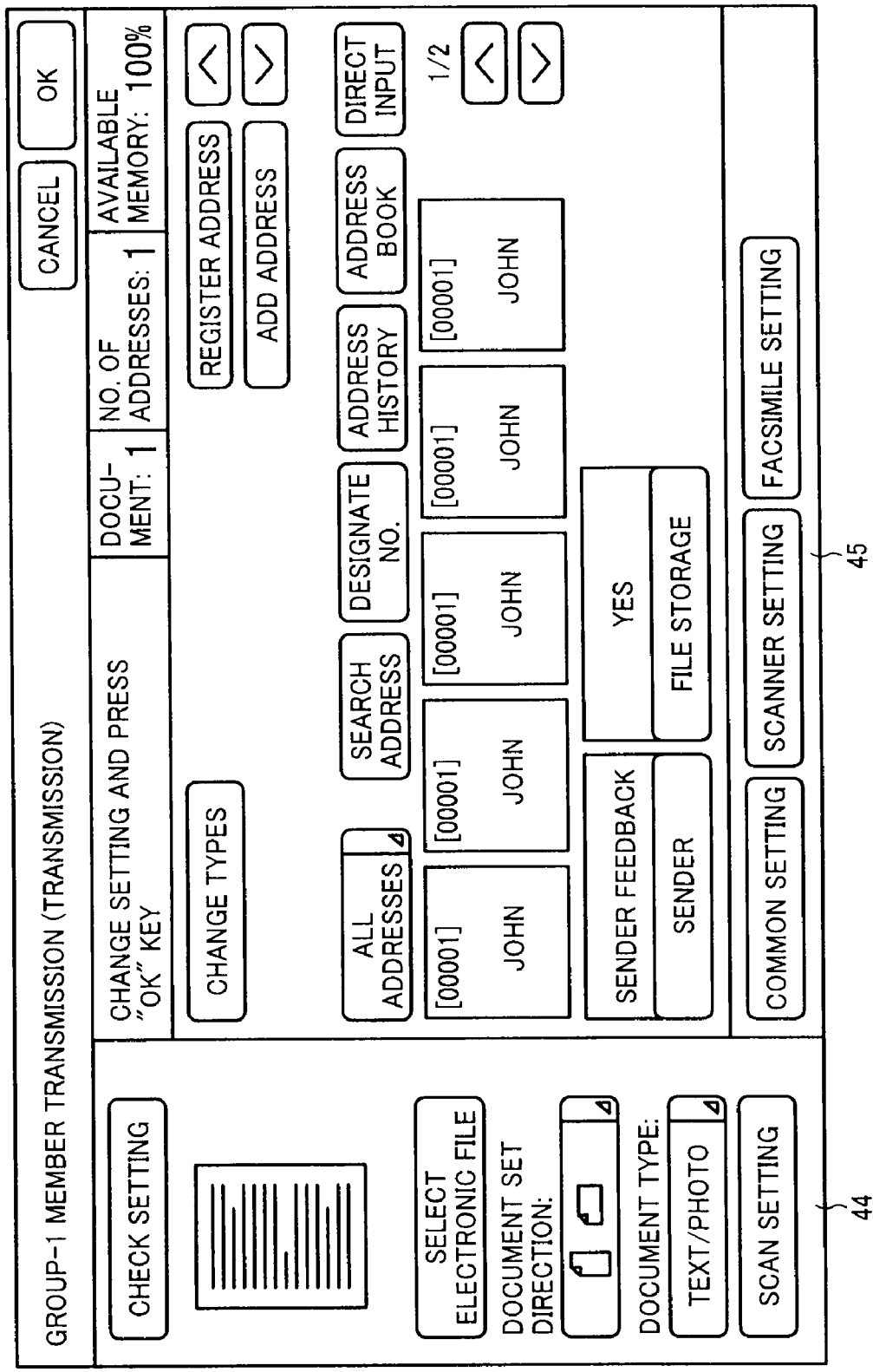
FIG. 7 is an illustration of an example of a transmission-application setting screen.

FIG. 7 is an illustration of an example of the transmission-application setting screen.

The transmission-application setting screen illustrated in FIG. 7 is an example of the transmission-application setting screen displayed in the above-described routine task named "group-1 member transmission" and includes the scanner-input-setting-item display area 44 and the transmission-output-setting-item display area 45.

FIG. 8 is an illustration of an example of the storage-application setting screen.

The storage-application setting screen illustrated in FIG. 8 is an example of the storage-application setting screen displayed in the above-described routine task named "group-1 member transmission" and includes the scanner-input-setting-item display area 47 and the storage-output-setting-item display area 48.

FIG. 9 is an illustration of an example of a list containing input-setting items and output-setting items of each of the copy-application setting screen, the transmission-application setting screen, and the storage-application setting screen.

As illustrated in FIG. 9, the input-setting items may include document set direction, document type, final document specification, and (image reading) finished stamp. The "processing" column of the output-setting items may include integration (e.g., 2 pages in 1 sheet), magnification, image-quality adjustment, and drop-out color processing. The "output" column of the output-setting items may include color selection, stapling, sorting, and address designation.

Next, a description is given of an example of feedback display in the image forming apparatus.

FIG. 11 is an illustration of an example of feedback display in the multi-application screen.

On the multi-application screen illustrated in FIG. 5, the copy setting button 35 may be selected to change the content of copy setting in a routine task. For example, when color selection in the output-setting items of the copy application is changed from black-and-white to full color, the item "color selection" is present in the output setting items of the other applications but is not affected by the change of the copy application. Accordingly, no application is identified by the affected-application identification unit 13, and no difference in the setting items before and after the above-described change is identified by the setting-item difference identification unit 12.

Hence, the display contents of the copy display area 31, the transmission display area 32, and the storage display area 33 are changed as illustrated in FIG. 10.

Each of the copy display area 31, the transmission display area 32, and the storage display area 33 displays a term "change difference" indicating that the current display is feedback display. Further, the copy display area 31 indicates that the color selection in the output setting items is changed to "full color". Each of the transmission display area 32 and the storage display area 33 displays a term "<none>" indicating that no setting items for the other applications are changed by the change in the color selection of the copy application.

Further, if the number of contents of setting items changed by the change of setting items for the copy application exceeds a number of contents that can be displayed within each display area, a message, such as "etc.", may be displayed.

As described above, each of the copy display area 31, the transmission display area 32, and the storage display area 33 may include, for example, a first sub-area for displaying during execution of feedback display the term "change difference", indicating that the current display is feedback display, and a second sub-area for displaying a message indicating that, when a setting item or the content of a setting item of one application is changed, no change is automatically made in a setting item or the content of a setting item of any other application. Such a configuration can provide a user with an easy-to-view screen, thus allowing a user to easily assess the effect of a change in the settings of one application on any other application.

Next, a description is given of another example of feedback display in the image forming apparatus.

FIG. 11 is another example of feedback display in the multi-application screen.

In the multi-application screen illustrated in FIG. 5, for example, when the copy setting button 35 is selected and the number of copies is changed to 15 copies, the change in the number of copies for the copy application causes no associated change in the setting items or the contents thereof for the other applications since the other applications have no corresponding output-setting item for the number of copies. Accordingly, no application is identified by the affected-application identification unit 13, and no difference in the setting items before and after the above-described change is identified by the setting-item difference identification unit 12.

Hence, the display contents of the copy display area 31, the transmission display area 32, and the storage display area 33 are changed as illustrated in FIG. 11.

Each of the copy display area 31, the transmission display area 32, and the storage display area 33 displays the term "change difference" indicating that the current display is feedback display. Further, the copy display area 31 indicates that the number of copies in the output-setting items is changed to "15 copies". Accordingly, each of the transmission display area 32 and the storage display area 33 displays a term "<none>" indicating that no setting items for the other applications are changed by the change in the number of copies of the copy application.

Next, a description is given of another example of feedback display in the image forming apparatus.

Figure 12:
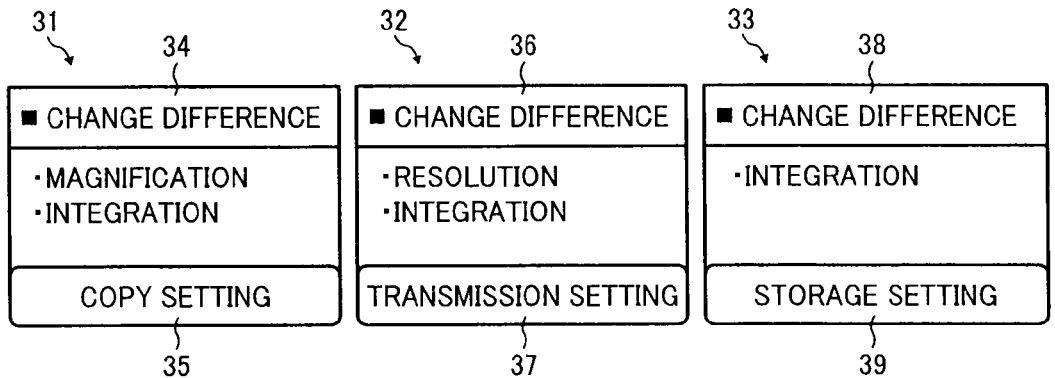
FIG. 12 is an illustration of an example of feedback display on the multi-application screen.

FIG. 12 is another example of feedback display in the multi-application screen.

In the multi-application screen illustrated in FIG. 5, after the copy setting button 35 is selected, the contents of a plurality of setting items in the copy setting of a routine task may be changed. For example, if the magnification in the copy setting is changed and integration print is set, the magnification change influences the resolution of the transmission application and integration print for the transmission application is automatically set depending on the setting of integration print for the copy application. Accordingly, one application is identified by the affected-application identification unit 13, and the difference in the contents of setting items before and after the above-described change is identified by the setting-item difference identification unit 12.

Hence, the display contents of the copy display area 31, the transmission display area 32, and the storage display area 33 are changed as illustrated in FIG. 12.

Each of the copy display area 31, the transmission display area 32, and the storage display area 33 displays the term "change difference" indicating that the current display is feedback display. The copy display area 31 also indicates that the magnification in the output-setting items is changed and the integration print is set. The transmission display area 32 also indicates that the resolution of transmission setting is changed by the change in the magnification of copy setting, and that integration print in the transmission setting is activated by the activation of integration print in the copy setting. The storage display area 33 also indicates that integration print in the storage setting is activated by the activation of integration print in the copy setting.

Thus, the change from the original routine task is displayed, allowing a user to easily ascertain what content is added and/or changed in setting items of each application.

Next, a description is given of another example of feedback display in the image forming apparatus.

Figure 13:
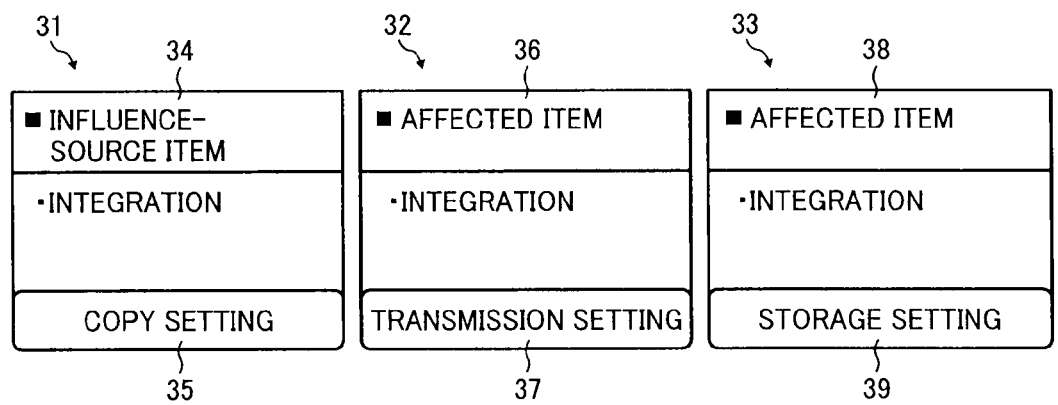
FIG. 13 is an illustration of an example of feedback display on the multi-application screen.

FIG. 13 is another example of feedback display in the multi-application screen.

In the multi-application screen illustrated in FIG. 5, after the copy setting button 35 is selected, integration print may additionally be set to the copy setting. In such a case, the other applications also have a setting item of "integration print" and integration print for the other applications is activated by the activation of integration print for the copy application. Accordingly, the other applications are identified by the affected-application identification unit 13, and the difference in the contents of setting items before and after the above-described change is identified by the setting-item difference identification unit 12.

Hence, the display contents of the copy display area 31, the transmission display area 32, and the storage display area 33 are changed as illustrated in FIG. 13.

The copy display area 31 displays a term "influence-source item" indicating that the change in any setting item of the copy application influences the settings of other applications, and a term "integration" indicating that integration print in the output-setting items is activated. The transmission display area 32 displays a term "affected item", indicating that the content of any setting item is affected by the change of the copy setting, and the term "integration", indicating that integration print in the transmission setting is activated depending on the activation of integration print in the copy setting. Similarly, the storage display area 33 displays the term "affected item", indicating that the content of any setting item of the transmission application is affected by the change of the copy setting, and the term "integration", indicating that integration print in the storage setting is activated depending on the activation of integration print in the copy setting.

When the content in any setting item is changed between a plurality of applications in such an interconnected manner, the above-described configuration allows a user to distinguish an influence-source item and an affected item and recognize such a changed content.

Next, a description is given of another example of feedback display in the image forming apparatus.

Figure 14:
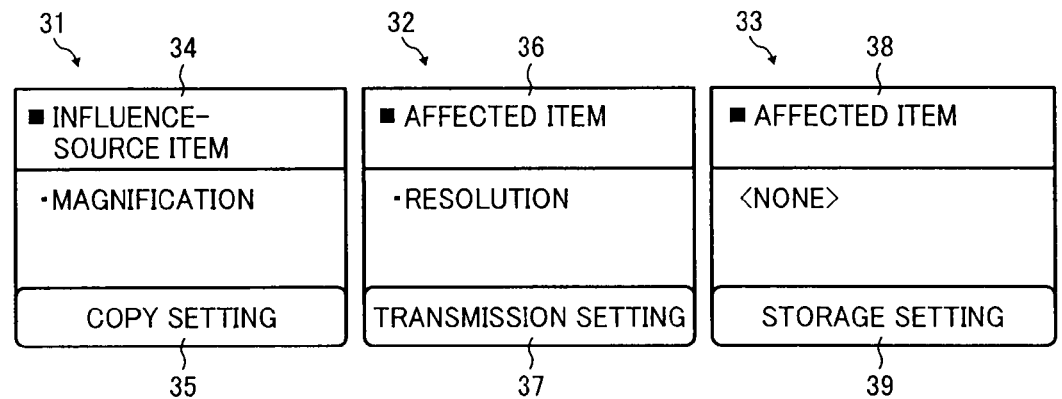
FIG. 14 is an illustration of an example of feedback display on the multi-application screen.

FIG. 14 is another example of feedback display in the multi-application screen.

In the multi-application screen illustrated in FIG. 5, after the copy setting button 35 is selected, the magnification value of the copy setting may be changed. In such a case, although the other applications do not have a magnification setting, setting items of the other applications may be changed by the change in the magnification of the copy application. For example, if the transmission application does not have the same function as "magnification", the setting item of "resolution" for the transmission application may be associated with the setting of "magnification" for the copy application. In such a case, the transmission application is identified by the affected-application identification unit 13, and the difference in the contents of setting items before and after the above-described change is identified by the setting-item difference identification unit 12.

Hence, the display contents of the copy display area 31, the transmission display area 32, and the storage display area 33 are changed as illustrated in FIG. 14.

The copy display area 31 displays the term "influence-source item" indicating that a change in the setting items of the copy application influences the setting of any other application and the term "magnification" indicating that the magnification value is changed by the change of the copy setting. The transmission display area 32 displays a term "affected item" indicating that the content of any setting item is affected by the change of the copy setting and the term "resolution" indicating that the resolution in the transmission setting is changed by the change of magnification in the copy setting. The storage display area 33 displays the term "affected item" and the term "<none>" indicating that no contents are influenced by the change of the copy setting.

Figure 15:
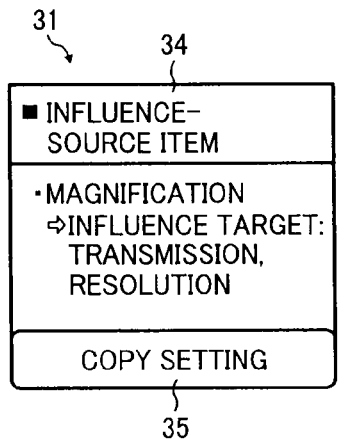
FIG. 15 is an illustration of an example of feedback display on the multi-application screen.

FIG. 15 is another example of feedback display in the multi-application screen.

The copy display area 31 may display content like that illustrated in FIG. 15. The display content of the copy display area 31 illustrated in FIG. 15 indicates that the resolution of the transmission application is affected by the change of magnification in the copy setting. Such display content allows a user to quickly identify an affected application and ascertain a changed setting item.

Next, a description is given of a display screen for prompting a user to select whether or not to activate a change of a setting item of one application in the image forming apparatus when the change influences the setting of another application.

Figure 16:
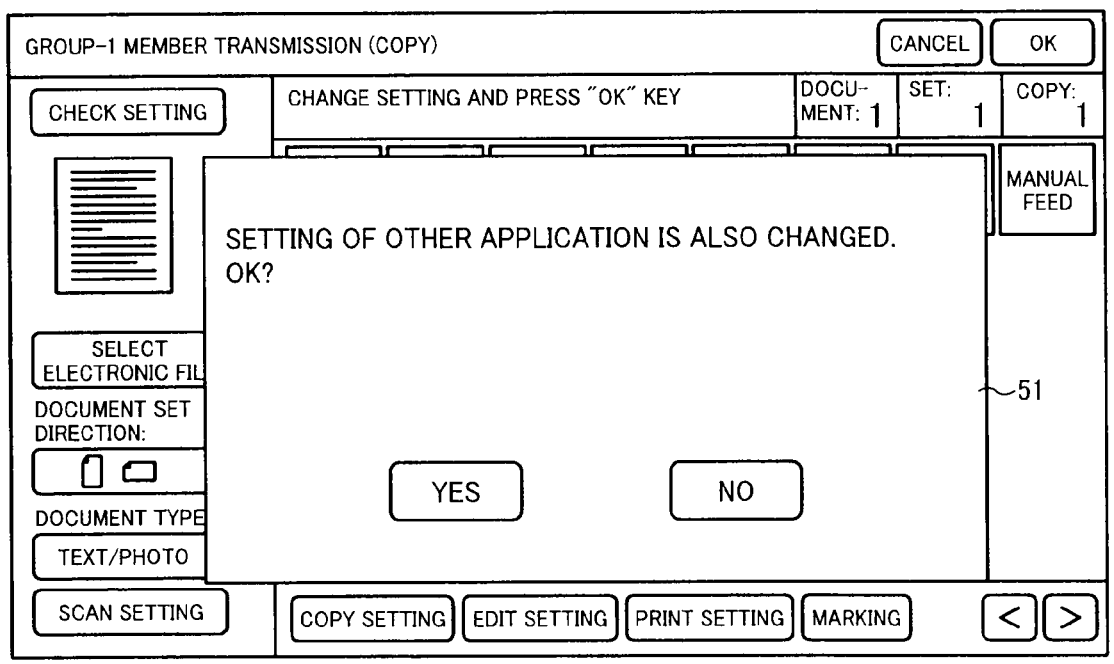
FIG. 16 is an illustration of an example of a display screen for prompting a user to select whether or not to activate a change in setting items.
Figure 17:
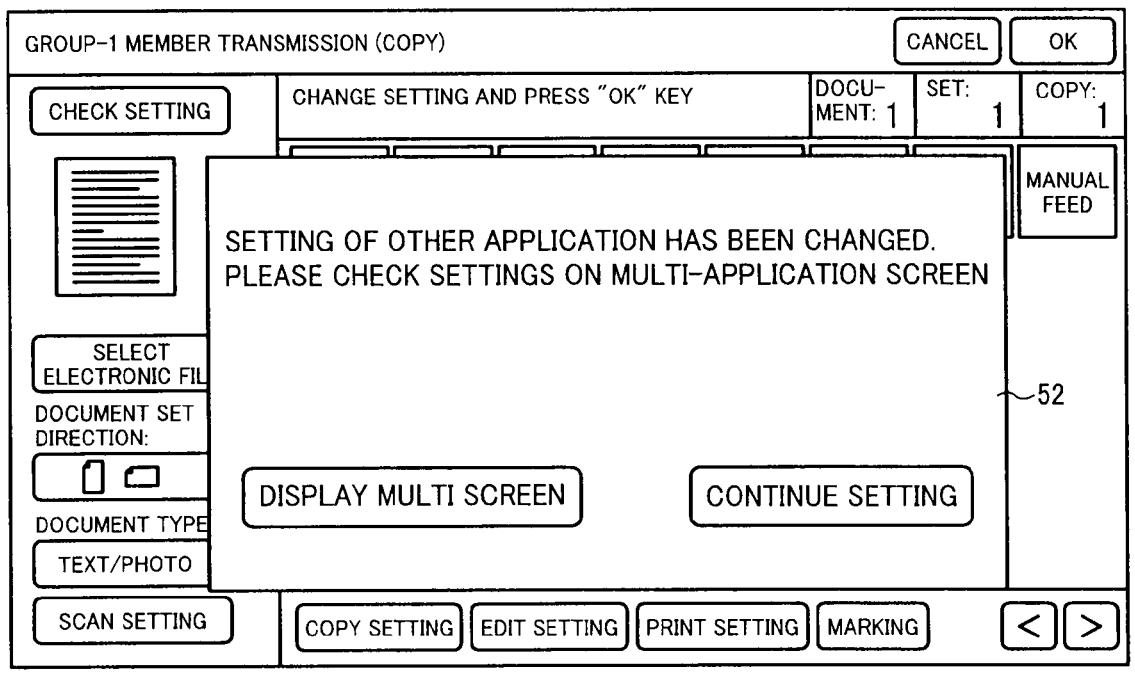
FIG. 17 is an illustration of an example of another display screen for prompting a user to select whether or not to activate a change in setting items.
Figure 18:
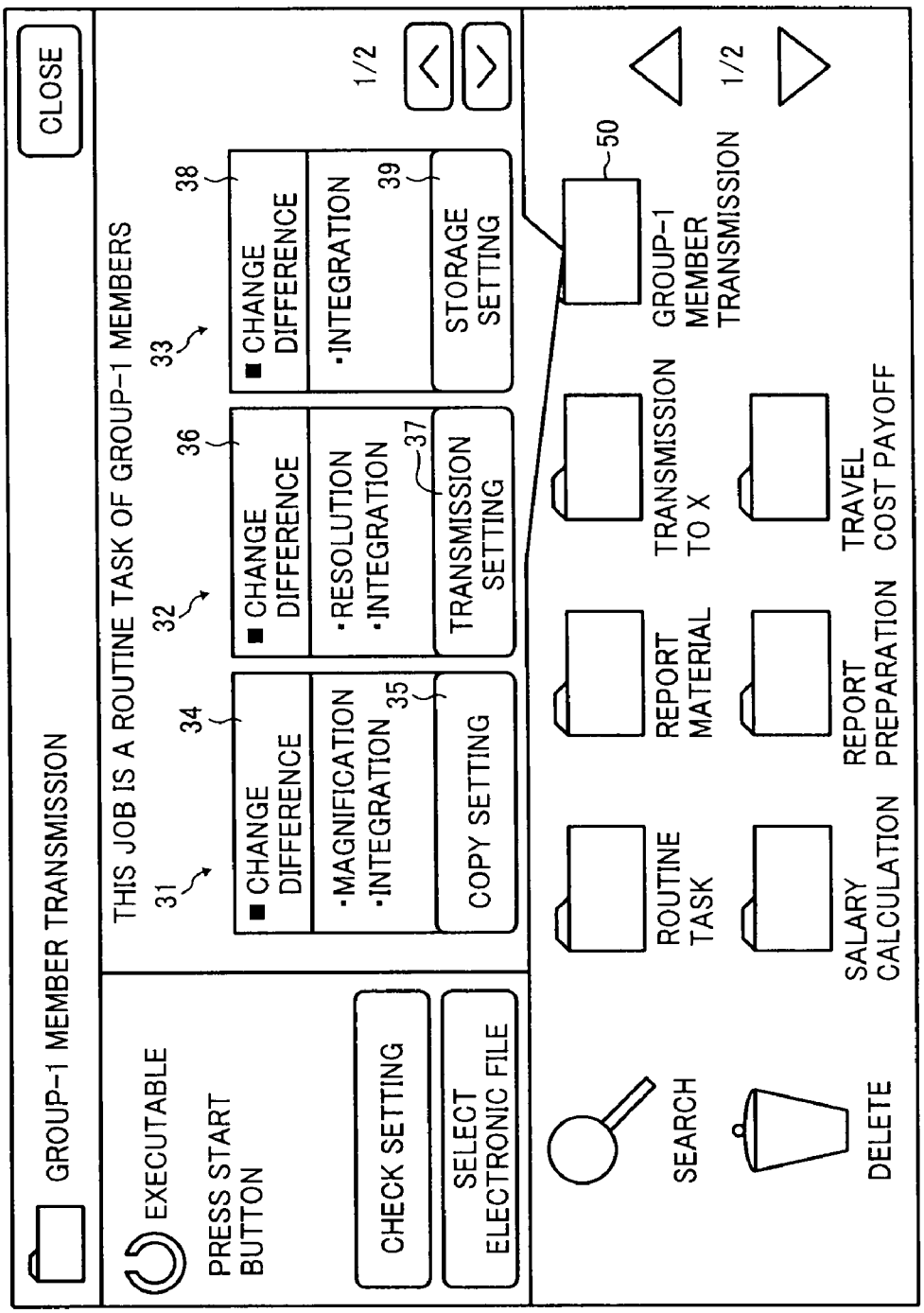
FIG. 18 is an illustration of an example of still another display screen for prompting a user to select whether or not to activate a change in setting items.

FIGS. 16 to 18 are examples of the display screen for prompting a user to select whether or not to activate such a change of a setting item.

For example, when the content of a setting item that influences another application is changed in the copy-application setting screen 40, as illustrated in FIG. 16 a dialogue 51 including a "YES" button for activating the change of the setting item and a "NO" button for canceling the change is displayed to prompt a user to select whether or not to activate the change of the setting item.

When the "YES" button of the dialogue 51 illustrated in FIG. 16 is selected, a dialogue 52 including a message of "Setting of other application has been changed. Please confirm setting on multi-application screen", a "Display multi-screen" button for shifting to the multi-application screen, and a "Continue setting" button for continuing the setting operation is displayed as illustrated in FIG. 17 to guide a user to the multi-application screen display.

When the "display multi-screen" button is selected, the multi-application screen illustrated in FIG. 18 is displayed, and the display contents of the copy display area 31, the transmission display area 32, and the storage display area 33 are switched to display the above-described contents for feedback display.

Alternatively, when the "continue setting" button is selected, the setting operation is continued.

Thus, while changing the content of a setting item of one application on the application setting screen, a user can easily ascertain the effect that such change has on other applications and can easily cancel the changed content of the setting item as necessary or desired.

Next, a description is given of an example of feedback display in the image forming apparatus.

Figure 19:
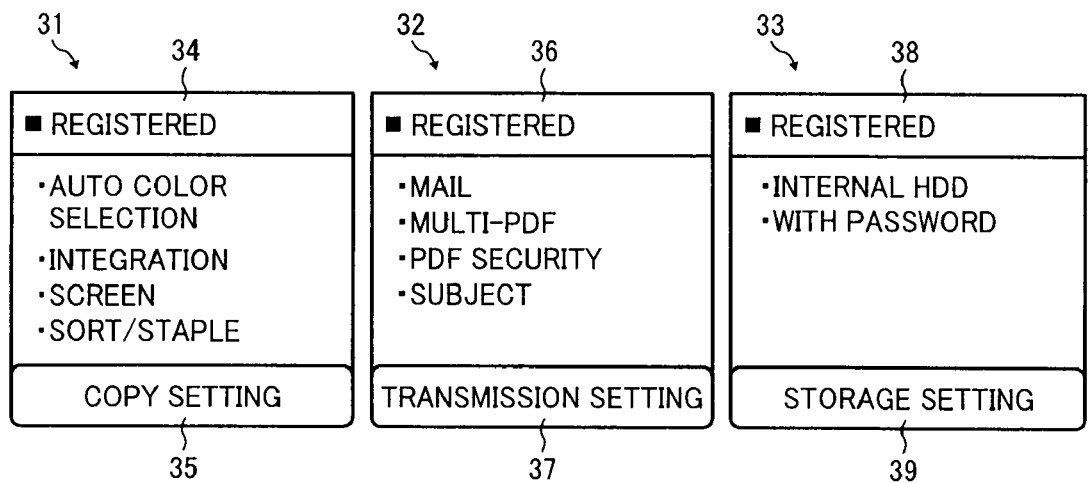
FIG. 19 is an illustration of an example of feedback display in the multi-application screen.
Figure 20:
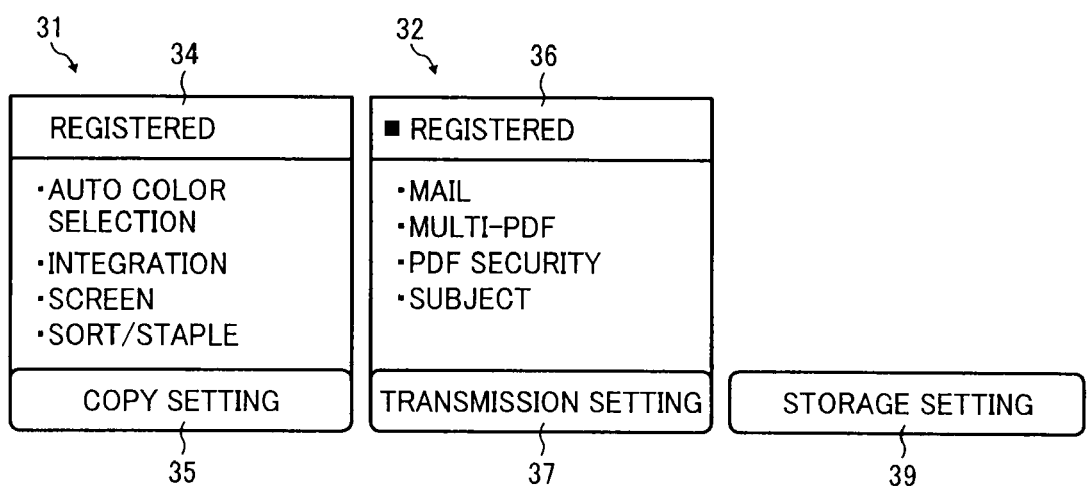
FIG. 20 is an illustration of an example of feedback display in the multi-application screen.

FIGS. 19 and 20 are other examples of the feedback display in the multi-application screen.

For example, when feedback display is executed on the multi-application screen in a routine task for which all the copy, transmission, and storage applications are registered, each of the copy display area 31, the transmission display area 32, and the storage display area 33 displays a term "registered" indicating that the corresponding application is registered for the routine task, and the contents of setting items. For example, if the storage application is not registered for the routine task, as illustrated in FIG. 20 only a storage-setting button 39 may be displayed without displaying the other areas. Such a configuration allows a user to easily ascertain that the storage application is not registered for the routine task and quickly recognize the type of application registered for the routine task.

Figure 21:
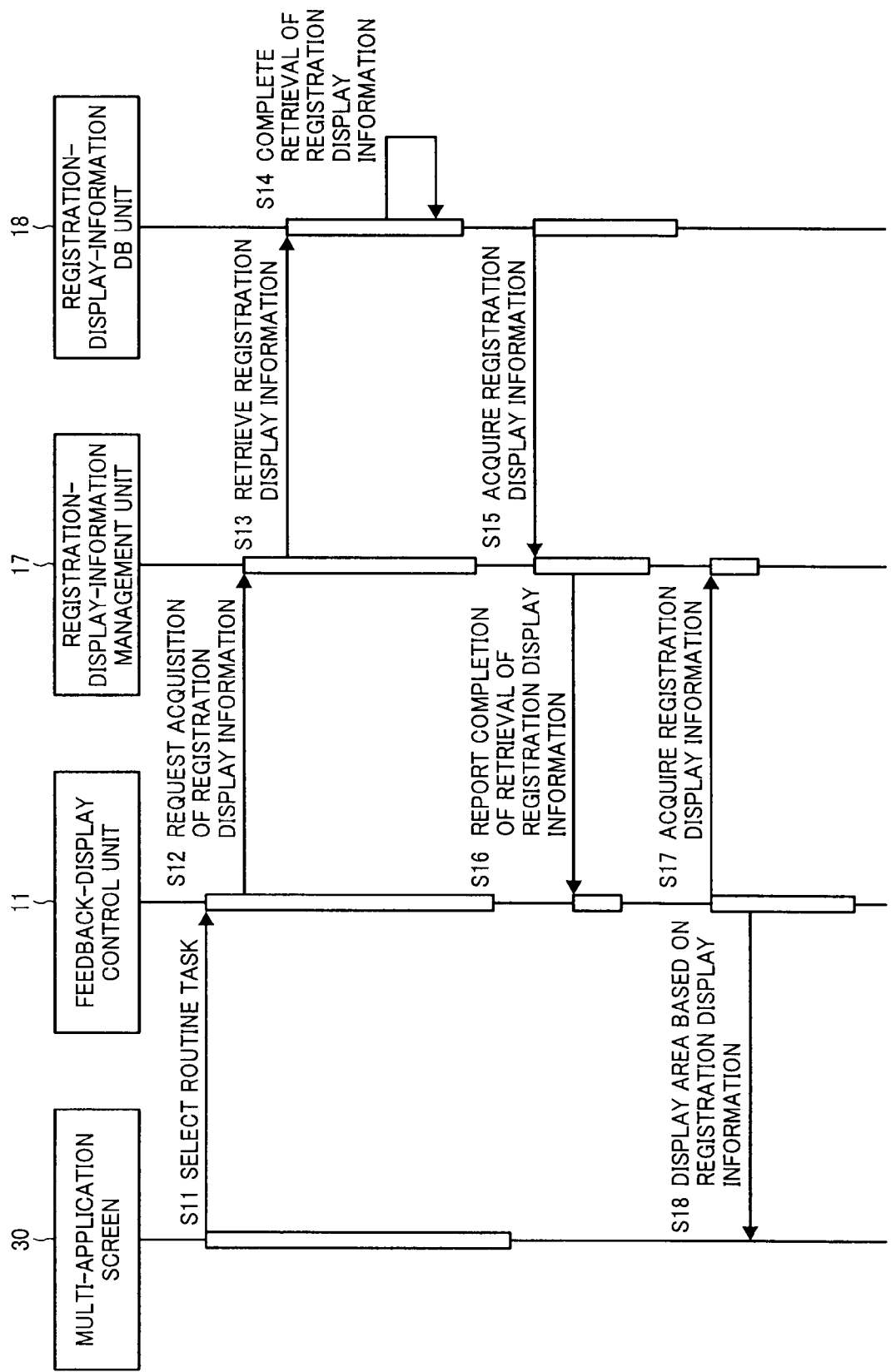
FIG. 21 is a sequence diagram illustrating a process of executing feedback display in accordance with registration information on an application registered for a routine task.

FIG. 21 is a sequence diagram illustrating a process of executing feedback display in accordance with registration information on an application registered for a routine task.

The user interface unit 10 illustrated in FIG. 1 may further include a registration-display-information management unit 17 and a registration-display-information database (DB) unit 18 illustrated in FIG. 21. The registration-display-information management unit 17 creates registration display information to be registered in the registration-display-information DB unit 18 and manages the registration display information registered in the registration-display-information DB unit 18 by referencing, updating, and deleting the registration display information.

The registration-display-information DB unit 18 is a storage unit to store registration display information. The registration display information includes, for example, setting items displayed in the display area of each application, which is registered for a routine task, on the multi-application screen 30 and a display order of the setting items. In the abovementioned example of the routine task "group-1 member transmission", the copy, transmission, and storage applications are registered. Accordingly, the registration display information includes, for example, setting items displayed in the copy display area 31, the transmission display area 32, and the storage display area 33, and a display order of the setting items in each area.

In FIG. 21, when at S11 a routine task is selected on the multi-application screen 30, at S12 the feedback display control unit 11 requests the registration-display-information management unit 17 to acquire registration display information. At S13, the registration-display-information management unit 17 retrieves registration display information associated with the selected routine task from the registration-display-information DB unit 18.

When the retrieval of the registration display information is completed at S14, at S15 the registration-display-information management unit 17 reads and acquires the retrieved registration display information from the registration-display-information DB unit 18. At S16, the registration-display-information management unit 17 reports the completion of acquisition of the registration display information to the feedback display control unit 11.

When at S17 the feedback display control unit 11 acquires the registration display information, at S18 the feedback display control unit 11 instructs the multi-application screen 30 to display the display area of each of the applications registered for the routine task in accordance with the registration display information.

For example, for the routine task "group-1 member transmission", the copy display area 31, the transmission display area 32, and the storage display area 33 are displayed on the multi-application screen 30, and the setting items registered as the registration display information are displayed in each area in the display order.

Next, a description is given of a procedure of setting registration display items and a display order of the items in the image forming apparatus.

For the setting of registration display information, when a user registers an application for a routine task, a user is guided to a setting confirmation screen to set such registration display information.

Figure 22:
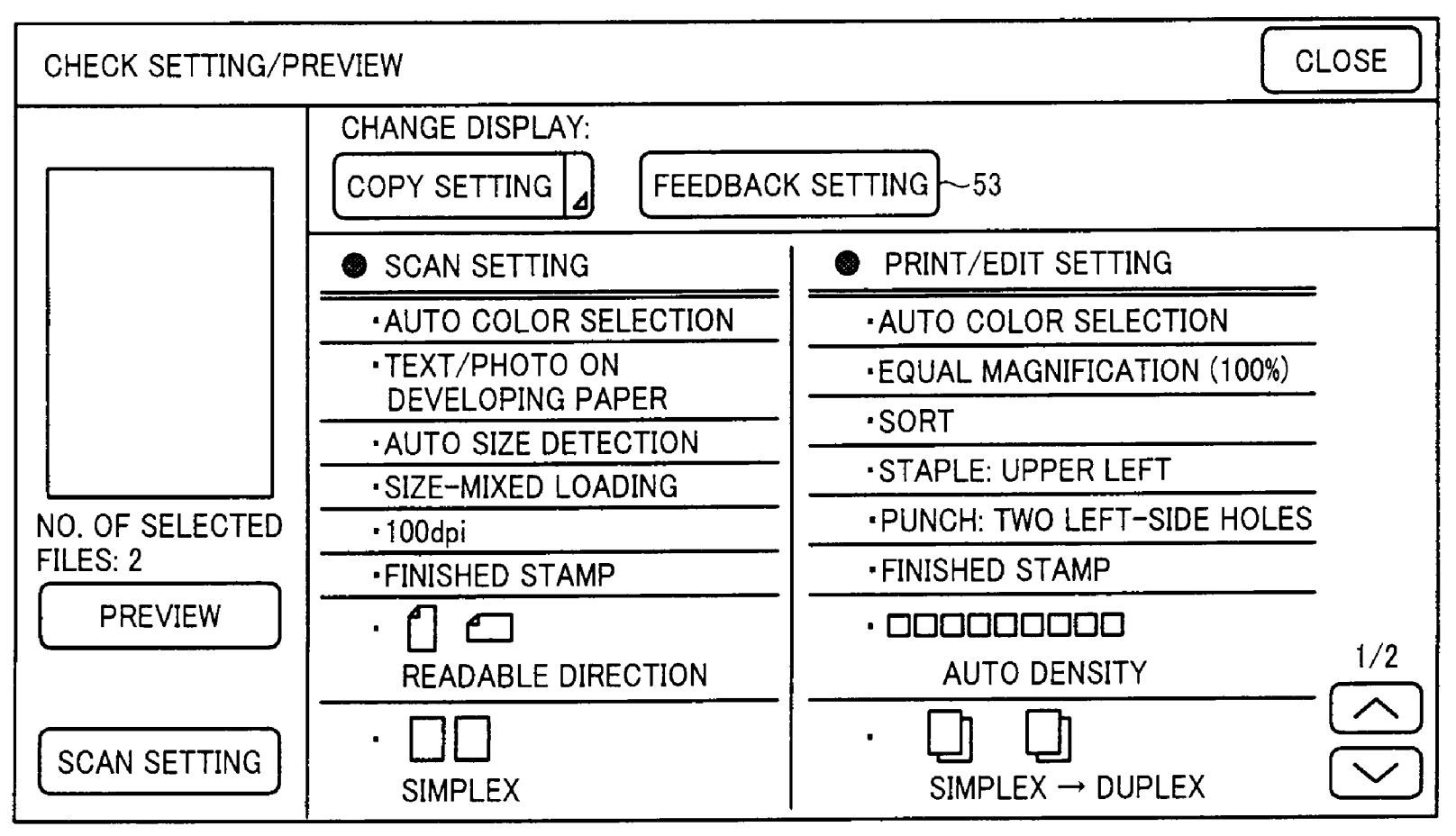
Figure 23:
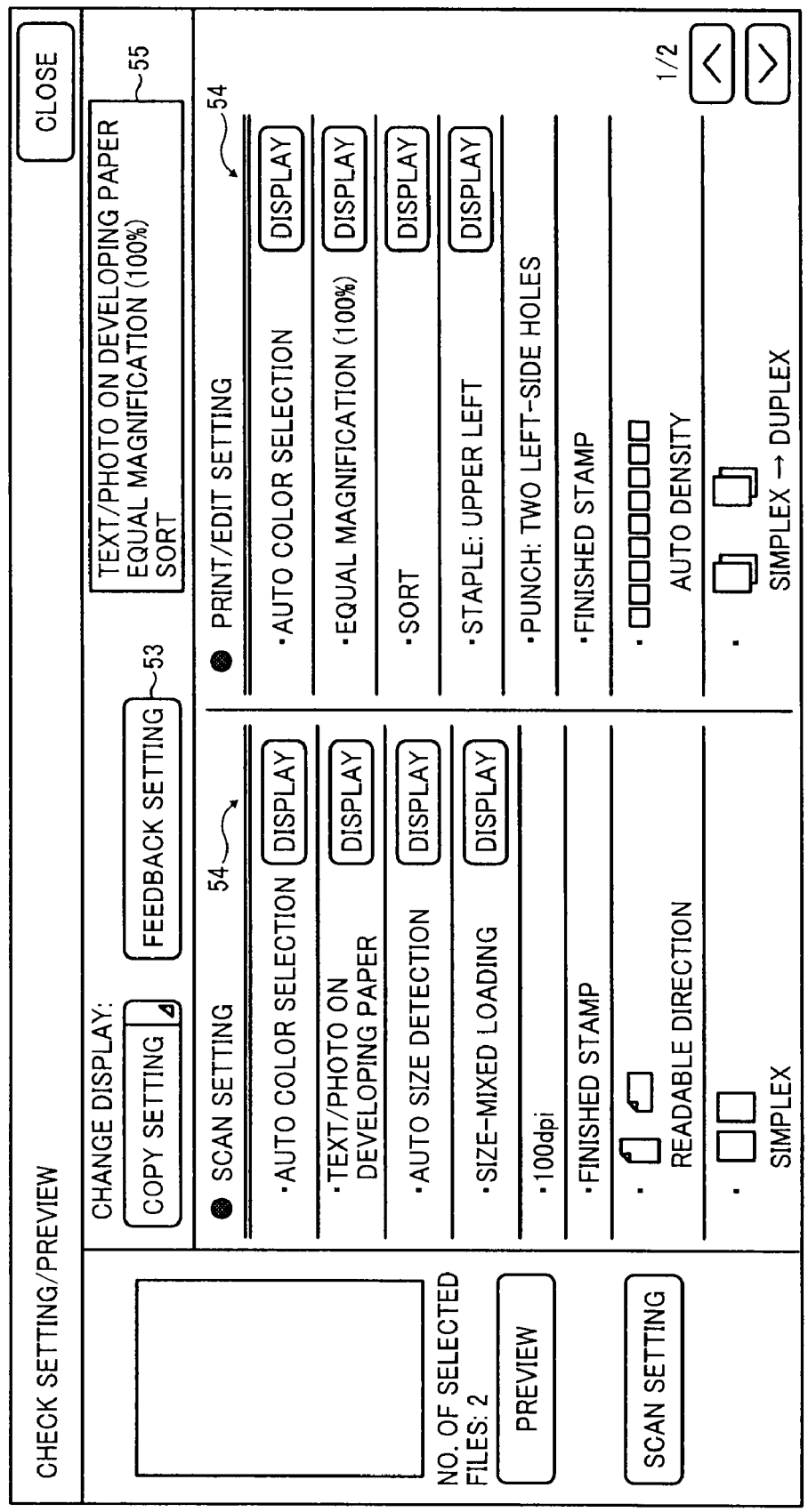
FIG. 23 is an illustration of another display example of the setting screen for setting registration display information.

FIGS. 22 and 23 are illustrations of examples of the setting screen of registration display information.

FIG. 22 is an illustration of a setting screen for selecting items to be displayed in the copy display area 31. As illustrated in FIG. 22, the setting screen displays, for example, automatic color selection, text/photo on developing paper, and other items of the read setting.

For example, when a feedback setting button 53 on the setting screen is selected, the display content of the setting screen is changed to a display content illustrated in FIG. 23. As a result, a plurality of display selection buttons 54 for selecting items to be displayed in a relevant display area in feedback display is displayed near each of input setting items.

For example, when the display selection buttons 54 for the setting items regarding text/photo on developing paper, equal magnification (100%), and sort are selected, a display image 55 is displayed within the display area for feedback display so that a user can confirm the selected items. Such selected items in the display area are displayed in a display order selected by a user.

Alternatively, if no registration display items are designated by a user at the registration of a routine task, predetermined items are displayed in a predetermined display order. Further, if the content of the routine task is changed, items set in the registration of the routine task may be continuously displayed.

Thus, when a multi-application registered for a routine task is selected, settings designated by a user are displayed, allowing a user to easily gain an outline of the settings of the routine task.

Next, a description is given of another example of feedback display in the image forming apparatus.

Figure 24:
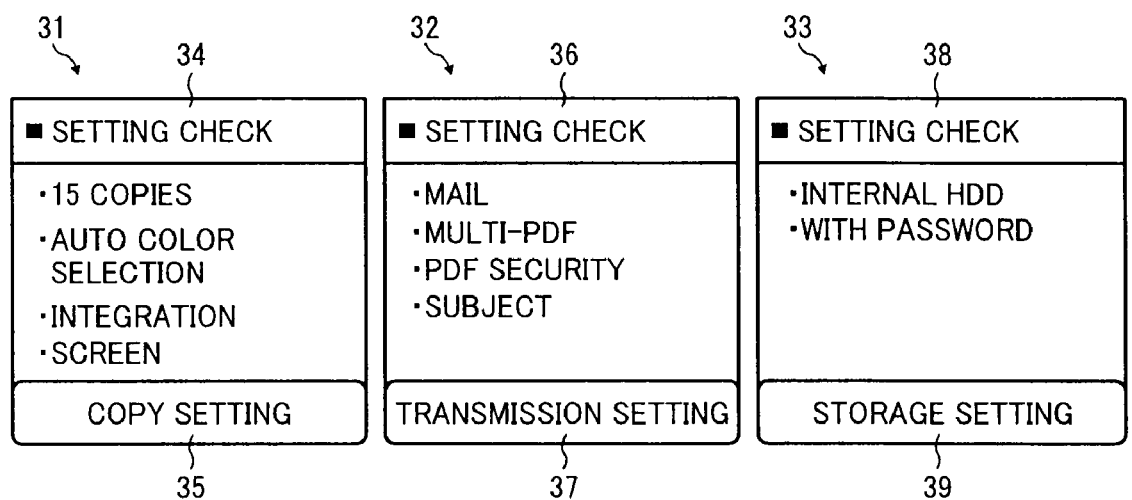
FIG. 24 is an illustration of an example of feedback display on the multi-application screen.

FIG. 24 is an illustration of another example of feedback display on the multi-application screen.

For the example of feedback display illustrated in FIG. 24, setting items of the copy application are changed in the copy display area 31, the difference in setting items before and after the change is displayed using feedback display, and the display content is switched to registration display.

For example, when the value of the number of copies in the copy setting is changed and the display content is switched to the registration display, the display contents of the copy display area 31, the transmission display area 32, and the storage display area 33 are changed to the contents as illustrated in FIG. 24.

Each of the copy display area 31, the transmission display area 32, and the storage display area 33 displays a term "setting check", changed setting items, and a number of setting items that can be displayed within the feedback display area from among setting items registered in the above-described registration display information.

At this time, the changed setting items are preferentially displayed compared to the setting items registered in the registration display information.

Accordingly, when the total number of the changed setting items and the setting items registered in the registration display information exceeds a number of setting items that can be displayed in the feedback display area, the changed setting items having a relatively high priority in the display order are displayed while a portion of the setting items registered in the registration display information may not be displayed.

As described above, the contents of setting items designated at the registration as well as the change difference are displayed, allowing a user to gain an outline of current settings of each application registered for a routine task.

The image processing apparatus, the information display method used in the image processing apparatus, and the recording medium storing instructions causing the image processing apparatus to execute the information display method according to the present disclosure are applicable to an image forming apparatus, such as a facsimile machine, a printer, a copier, and a multi-functional periphery having several of the foregoing capabilities and to an information processing apparatus such as a personal computer.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of recording or storage medium.

Examples of such a recording or storage medium include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

What is claimed is:

1. An image processing apparatus, comprising:
   a processor; and
   a storage device to store computer programmed instructions which when activated by the processor cause the processor to operate as a specially programmed processor, the processor configured to:
   execute a multi-application in which a plurality of applications is combined, each of the plurality of applications configured to input, process, and output image data;
   display, when a user enters settings for each of the plurality of applications, an application setting screen including an input-setting-item display area to enter an input-setting item that influences an input operation of the inputting and an output-setting-item display area to enter an output-setting item that influences at least one of a processing operation of the processing and an output operation of the outputting;
   display a multi-application screen including a feedback display area that displays information containing contents of the input-setting item and the output setting item entered for the inputting, the processing, and the outputting of each of the plurality of applications;
   identify, when a content of at least one of the input setting item entered for the inputting and the output setting item input for at least one of the processing and the outputting is changed for one application of the plurality of applications, another application for which a content of at least one of the input setting item input for the inputting and the output setting item entered for at least one of the processing and the outputting is changed by the setting change for the one application;
   identify a difference before and after the change in the content of the at least one of the input setting item and the output setting item of another application identified by the identifying the another application in response to a difference being present; and
   switch a display content of the feedback display area in accordance with the difference identified by the identifying of the difference, to display setting-change-influence information on effect of the setting change for the one application on the another application, by displaying a content of the difference in response to the difference being identified by the identifying of the difference, and displaying that no difference is identified in response to the difference not being identified by the identifying of the difference.

2. The image processing apparatus according to claim 1, wherein the processor is configured to switch the display content of the feedback display area to display the setting-change-influence information when a list of previously-registered multi-applications is displayed on a multi-application screen, the feedback display area of one multi-application selected from the list is displayed, the application setting screen of one application selected from the feedback display area displayed on the multi-application screen is displayed, a content of at least one of the input setting item and the output setting item is changed using the displayed application setting screen, and the application setting screen is switched to the multi-application screen.

3. The image processing apparatus according to claim 1, wherein the setting-change-influence information includes information indicating that another application is affected by the setting change for the one application and the changed content of the at least one of the input-setting item and the output-setting item.

4. The image processing apparatus according to claim 3, the processor is configured to set the at least one of the input-setting item and the output-setting item displayed on the feedback display area to the changed content.

5. The image processing apparatus according to claim 4, the processor is configured to additionally display items in the feedback display area.

6. The image processing apparatus according to claim 1, wherein the processor is configured to select whether to activate or to cancel the change of the at least one of the input-setting item and the output-setting item.

7. The image processing apparatus according to claim 6, the processor is configured to display a screen for guiding a user to the multi-application screen when the change of the at least one of the input-setting item and the output-setting item is activated.

8. The image processing apparatus according to claim 3, wherein the feedback display area includes a first area for displaying the information indicating that the another application is affected by the setting change for the one application and a second area for displaying the changed content of the at least one of the input-setting item and the output-setting item.

9. An information display method used in an image processing apparatus, the method comprising the steps of:
   executing a multi-application in which a plurality of applications is combined, including inputting image data to the image processing apparatus, processing the image data input at the inputting, and outputting the processed image data;
   displaying, when a user enters setting items for each of the plurality of applications, an application setting screen including an input-setting-item display area to enter an input-setting item that influences an input operation of the inputting and an output-setting-item display area to enter an output-setting item that influences at least one of a processing operation of the processing and an output operation of the outputting;
   displaying a multi-application screen including a feedback display area to display information containing contents of the input-setting item entered for the inputting and the output setting item entered for the at least one of the processing and the outputting of each of the plurality of applications;

identifying, when a content of at least one of the input setting item entered for the inputting and the output setting item entered for the at least one of the processing and the outputting is changed for one application of the plurality of applications, another application for which a content of at least one of the input setting item entered for the inputting and the output setting item entered for at least one of the processing and the outputting is changed by the setting change for the one application;

identifying a difference before and after the change in the content of the at least one of the input setting item entered for the inputting and the output setting item entered for the at least one of the processing and the outputting of the another application identified by the identifying step of the another application in response to a difference being present; and switching a display content of the feedback display area in accordance with the difference identified by the identifying a difference step, to display setting-change-influence information on influence of the setting change for the one application on the another application, by displaying a content of the difference in response to the difference being identified by the identifying a difference step, and displaying that no difference is identified in response to the difference not being identified by the identifying a difference step.

10. The method according to claim 9, wherein the switching step is executed when a list of previously-registered multi-applications is displayed on a multi-application screen, the feedback display area of one multi-application selected from the list is displayed, the application setting screen of one application selected from the feedback display area displayed on the multi-application screen is displayed, a content of at least one of the input setting and the output setting item is changed using the displayed application setting screen, and the application setting screen is switched to the multi-application screen.

11. The method according to claim 9, wherein the setting-change-influence information includes information indicating that the another application is affected by the setting change for the one application and the changed content of the at least one of the input-setting item and the output-setting item.

12. The method according to claim 11, wherein the feedback display area includes a first area for displaying the information indicating that the another application is affected by the setting change for the one application and a second area for displaying the changed content of the at least one of the input-setting item and the output-setting item.

13. The method according to claim 9, further comprising a step of selecting to activate or to cancel the change of the at least one of the input-setting item and the output-setting item.

14. The method according to claim 13, further comprising a step of displaying a screen for guiding a user to the multi-application screen when the change of the at least one of the input-setting item and the output-setting item is activated in the selecting step.

15. An image processing apparatus, comprising:
multi-application execution means for executing a multi-application in which a plurality of applications is combined, each of the plurality of applications including input means for inputting image data and processing output means for processing the image data input from the input means and outputting the processed image data;

application-setting-screen display means for, when a user enters settings for each of the plurality of applications, displaying an application setting screen including an input-setting-item display area to enter an input-setting item that influences an input operation of the input means and an output-setting-item display area to enter an output-setting item that influences at least one of a processing operation and an output operation of the processing output means;

multi-application-screen display means for displaying a multi-application screen including a feedback display area that displays information containing contents of the input-setting item and the output setting item entered for the input means and the processing output means of each of the plurality of applications;

affected-application identification means for, when a content of at least one of the input setting item entered for the input means and the output setting item input for the processing output means is changed for one application of the plurality of applications, identifying another application for which a content of at least one of the input setting item input for the input means and the output setting item entered for the processing output means is changed by the setting change for the one application;

setting-item difference identification means for identifying a difference before and after the change in the content of the at least one of the input setting item and the output setting item of another application identified by the affected-application identification means in response to a difference being present; and feedback-display control means for switching a display content of the feedback display area in accordance with the difference identified by the setting-item difference identification means, to display setting-change-influence information on effect of the setting change for the one application on another application, by displaying a content of the difference in response to the difference being identified by the setting-item difference identification means, and displaying that no difference is identified in response to the difference not being identified by the setting-item difference identification means.

16. The image processing apparatus according to claim 15, wherein the feedback display control means switches the display content of the feedback display area to display the setting-change-influence information when a list of previously-registered multi-applications is displayed on a multi-application screen, the feedback display area of one multi-application selected from the list is displayed, the application setting screen of one application selected from the feedback display area displayed on the multi-application screen is displayed, a content of at least one of the input setting item and the output setting item is changed using the displayed application setting screen, and the application setting screen is switched to the multi-application screen.

17. The image processing apparatus according to claim 15, wherein the setting-change-influence information includes information indicating that another application is affected by the setting change for the one application and the changed content of the at least one of the input-setting item and the output-setting item.

18. The image processing apparatus according to claim 17, wherein the feedback display area includes a first area for displaying the information indicating that the another application is affected by the setting change for the one application and a second area for displaying the changed content of the at least one of the input-setting item and the output-setting item.

19. The image processing apparatus according to claim 15, further comprising selection means for selecting whether to activate or to cancel the change of the at least one of the input-setting item and the output-setting item.

20. The image processing apparatus according to claim 19, further comprising screen display means for displaying a screen for guiding a user to the multi-application screen when the change of the at least one of the input-setting item and the output-setting item is activated using the selection means.

\* \* \* \* \*